(12) United States Patent
Hiramoto et al.

(10) Patent No.: US 11,479,667 B2
(45) Date of Patent: Oct. 25, 2022

(54) TWO-PART CURABLE URETHANE-BASED COMPOSITION

(71) Applicant: Showa Denko Materials Co., Ltd., Tokyo (JP)

(72) Inventors: Yuya Hiramoto, Tokyo (JP); Hisao Matsumiya, Tokyo (JP); Kazuhiko Mori, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 577 days.

(21) Appl. No.: 16/495,454

(22) PCT Filed: Mar. 29, 2017

(86) PCT No.: PCT/JP2017/013059
§ 371 (c)(1),
(2) Date: Sep. 19, 2019

(87) PCT Pub. No.: WO2018/179178
PCT Pub. Date: Oct. 4, 2018

(65) Prior Publication Data
US 2020/0024449 A1 Jan. 23, 2020

(51) Int. Cl.
| | | |
|---|---|---|
| *C08L 75/04* | (2006.01) | |
| *C08G 18/10* | (2006.01) | |
| *C08G 18/18* | (2006.01) | |
| *C08G 18/40* | (2006.01) | |
| *C08G 18/79* | (2006.01) | |
| *C08K 3/04* | (2006.01) | |
| *C08K 3/34* | (2006.01) | |
| *C08K 5/00* | (2006.01) | |
| *C08K 5/053* | (2006.01) | |
| *C08K 5/5415* | (2006.01) | |

(52) U.S. Cl.
CPC .............. *C08L 75/04* (2013.01); *C08G 18/10* (2013.01); *C08G 18/18* (2013.01); *C08G 18/40* (2013.01); *C08G 18/79* (2013.01); *C08K 3/04* (2013.01); *C08K 3/346* (2013.01); *C08K 5/0025* (2013.01); *C08K 5/053* (2013.01); *C08K 5/5415* (2013.01)

(58) Field of Classification Search
None
See application file for complete search history.

(56) References Cited

U.S. PATENT DOCUMENTS

| | | | | |
|---|---|---|---|---|
| 2003/0096110 A1* | 5/2003 | Terada | ............... | C08G 18/3206 428/355 R |
| 2018/0265618 A1* | 9/2018 | Arntz | ....................... | B32B 5/18 |

FOREIGN PATENT DOCUMENTS

| | | | |
|---|---|---|---|
| CN | 106459721 A | | 2/2017 |
| JP | 2006111811 A | * | 4/2006 |
| JP | 2006-131794 A | | 5/2006 |
| WO | WO-2017046274 A1 | * | 3/2017 ............... B32B 1/08 |

OTHER PUBLICATIONS

JP2006-111811 English Machine translation, prepared Jun. 13, 2022. (Year: 2022).*

* cited by examiner

*Primary Examiner* — Christopher M Rodd
(74) *Attorney, Agent, or Firm* — Faegre Drinker Biddle & Reath LLP

(57) ABSTRACT

A two-part curable urethane-based composition comprising a main agent (A); and a curing agent (B), wherein the main agent (A) contains a urethane prepolymer (a), an isocyanurate modified product of a polyisocyanate compound (b), and a silane coupling agent (c) in a specified ratio, the curing agent (B) contains a polyol (d) having a hydroxyl value of 50 to 500 mgKOH/g and an amine catalyst (e) in a specified amount, a mixing mass ratio of the main agent (A) to the curing agent (B) is 3:1 to 10:1, and an equivalent ratio of NCO group/OH group in the main agent (A) and the curing agent (B), respectively, is 1.0 to 5.0.

8 Claims, No Drawings

TWO-PART CURABLE URETHANE-BASED COMPOSITION

TECHNICAL FIELD

The present disclosure relates to a two-part curable urethane-based composition.

BACKGROUND ART

Steel sheets are typically used for interior and exterior parts of automobiles, such as a body, front door, rear door, back door, front bumper, rear bumper, and rocker molding, and they are required to reduce weight to meet the recent requirement to improve fuel consumption. Thus, the use of plastic materials such as polypropylene for interior and exterior parts of automobiles instead of steel sheets is increasing. Plastic materials such as polypropylene have low strength as compared with steel sheets, and talc, glass filler, and the like are typically added thereto to enhance the strength.

As adhesives for automobile parts made of plastics such as polypropylene, urethane-based compositions are suggested.

As urethane-based compositions, a one-part composition referred to as moisture curing because the composition is cured by the moisture in the air, and a two-part composition including a main agent and a curing agent are known. Among them, from the viewpoint of workability during adhesion process, two-part composition that allows to have enough working life (pot life, a period of time for a multi-liquid coating until the coating starts to cure by a chemical reaction, and the like) and allows quick curing is preferred.

Polypropylene base materials typically have a low surface polarity and a poor adhesiveness and in order to facilitate adhesion, a surface treatment to introduce polar groups to the surface of base materials is performed. The surface treatment may be applied by a plasma treatment, corona treatment, flame treatment, and the like. Further, since urethane-based compositions are difficult to apply directly to adhesion between polypropylene base materials subjected to surface treatments, a primer treatment is typically performed on the respective polypropylene base materials as a pretreatment, and then applied the urethane-based composition.

However, from the viewpoint of simplification of process and improvement of working environments, a non-primer treatment for adhesion of urethane-based compositions is required recently. In particular, the elimination of the primer treatment process (processless) is an outstanding request in the manufacturing process of automobiles since tact control of the assembly process is strict.

For example, Patent Literature 1 discloses a one-part moisture curing non-primer adhesive (urethane-based composition).

CITATION LIST

Patent Literature

Patent Literature 1: Japanese Unexamined Patent Publication No. 2006-131794

SUMMARY OF INVENTION

Technical Problem

However, since the non-primer adhesive of Patent Literature 1 is one-part, poor foam formation during curing or poor depth curability is concerned. In the urethane-based composition, the depth curability refers to the determination of curing conditions inside the coating not in contact with the wetness (moisture) in the atmosphere and evaluated from the thickness of the cured coating obtained after a given period of time.

From the viewpoint of actually using the two-part curable adhesive, the adhesive is desired to exert excellent performance with a wide range of mixing ratio, even if the mixing ratio (blending ratio) of the main agent to the curing agent is varied. Further, the mixing mass ratio of the main agent to the curing agent is often limited to 1:1 in the two-part curable adhesive, but from the viewpoint of enhancing adhesion strength, the adhesive is desired to exert excellent performance when the amount of the main agent blended is increased.

Therefore, an object of the present disclosure is to provide a two-part urethane-based composition having excellent depth curability, quick curability, and non-primer adhesiveness, when the mixing mass ratio of the main agent to the curing agent is within a range of 3:1 to 10:1.

Solution to Problem

The present inventors have conducted intensive studies to achieve the above object, and as a result, found that the two-part curable urethane-based composition shown in [1] to [4] below has excellent quick curability, non-primer adhesiveness, and moist-heat aging resistance.

[1] A two-part curable urethane-based composition comprising:
  a main agent (A); and
  a curing agent (B), wherein
  the main agent (A) contains a urethane prepolymer (a), an isocyanurate modified product of a polyisocyanate compound (b), and a silane coupling agent (c); a content of the isocyanurate modified product of a polyisocyanate compound (b) is 0.5 to 3.0 parts by mass based on 100 parts by mass of the urethane prepolymer (a); a content of the silane coupling agent (c) is 0.5 to 5.0 parts by mass based on 100 parts by mass of the urethane prepolymer (a),
  the curing agent (B) contains a polyol (d) having a hydroxyl value of 50 to 500 mgKOH/g and an amine catalyst (e); a content of the polyol (d) is 40% to 60% by mass based on a total amount of the curing agent (B); a content of the amine catalyst (e) is 1.0% to 10.0% by mass based on the total amount of the curing agent (B),
  a mixing mass ratio of the main agent (A) to the curing agent (B) is 3:1 to 10:1, and
  an equivalent ratio of NCO group/OH group in the main agent (A) and the curing agent (B), respectively, is 1.0 to 5.0.

[2] The two-part curable urethane-based composition according to [1], wherein at least one of the main agent (A) and the curing agent (B) further contains a carbon black (f), and a total content of the carbon black (f) is 10% to 30% by mass based on a total amount of the main agent (A) and the curing agent (B).

[3] The two-part curable urethane-based composition according to [1] or [2], wherein at least one of the main agent (A) and the curing agent (B) further contains a kaolin clay (g), and a total content of the kaolin clay (g) is 10% to 35% by mass based on the total amount of the main agent (A) and the curing agent (B).

[4] The two-part curable urethane-based composition according to any one of [1] to [3], wherein the urethane prepolymer (a) is a reaction product of a polyether polyol (a-1) having a number-average molecular weight of 8000 or more and diphenylmethane diisocyanate (a-2).

Advantageous Effects of Invention

The two-part curable urethane-based composition of the present disclosure has excellent depth curability, quick curability, and non-primer adhesiveness, when the mixing mass ratio of the main agent to the curing agent is within a range of 3:1 to 10:1.

DESCRIPTION OF EMBODIMENTS

Hereinafter, preferred embodiments of the present disclosure will be described, but the present disclosure is in no way limited to these embodiments. In the present description, the numerical range represented by using "to" indicates a range including numerical values described before and after the "to" as the minimum value and the maximum value, respectively. In the numerical range stepwise described in the present description, the upper limit value or the lower limit value of the numerical range of one stage may be replaced with the upper limit value or the lower limit value of the numerical range of the other stage. In the numerical range described in the present description, the upper or lower limit value of the numerical range may be replaced with the values shown in Examples.

The two-part curable urethane-based composition of the present embodiment (hereinafter, also simply referred to as a "urethane-based composition") comprises a main agent (A) and a curing agent (B). This urethane-based composition can be cured by mixing the main agent (A) and the curing agent (B). The urethane-based composition of the present embodiment is mixed so that the mass ratio of the main agent (A) to the curing agent (B) is 3:1 to 10:1.

The main agent (A) contains a urethane prepolymer (a), an isocyanurate modified product of a polyisocyanate compound (b), and a silane coupling agent (c). The curing agent (B) contains a polyol (d) having a hydroxyl value of 50 to 500 mgKOH/g and an amine catalyst (e). At least one of the main agent (A) and the curing agent (B) preferably contains at least one of a carbon black (f), kaolin clay (g) and plasticizer (h). Hereinafter, each component will be described.

Urethane Prepolymer (a)

The urethane prepolymer (a) is a reaction product of a compound having two or more active hydrogen groups and a polyisocyanate compound having two or more isocyanate groups. It is preferable that the urethane prepolymer of the present embodiment is reacted so that the number of isocyanate group becomes excessive and has an isocyanate group in a molecule.

Examples of the active hydrogen group include a hydroxy group (OH group), a carboxyl group (COOH group), an amino group ($NH_2$ group), a thiol group (SH group). The compound having two or more active hydrogen groups is preferably a polyol, and more preferably a polyether polyol (a-1).

Examples of the polyisocyanate compound include, an aromatic polyisocyanate in which an isocyanate group is bonded with an aromatic hydrocarbon, and an alicyclic polyisocyanate in which an isocyanate group is bonded with an alicyclic hydrocarbon. Among them, the aromatic polyisocyanate is preferable, a diphenylmethane diisocyanate (a-2) or a dicyclohexylmethane diisocyanate ($H_{12}MDI$) is more preferable, and a diphenylmethane diisocyanate (a-2) is further preferable.

The compound having two or more active hydrogen groups and the polyisocyanate compound having two or more isocyanate groups may be used singly or in combination of two or more.

Polyether Polyol (a-1)

The polyether polyol (a-1) is not particularly limited as long as it is a polyether polyol having two or more OH groups. Specific examples include a polyethylene glycol (PEG), a polypropylene glycol (PPG), an ethylene oxide/propylene oxide copolymer, a polytetramethylene ether glycol (PTMEG), and a sorbitol-based polyol. Among them, the polypropylene glycol (PPG) is preferable. The polyether polyol (a-1) may be used singly or in combination of two or more.

The polyether polyol (a-1) preferably has a number-average molecular weight of 8000 or more, and more preferably has a number-average molecular weight of 10000 or more. When the number-average molecular weight of the polyether polyol is 8000 or more, cohesion of a urethane prepolymer formed is not too high, and an adhesive having excellent thermal creep resistance can be produced. The polyether polyol can have high molecular weight by reducing by-products generated in the manufacturing process, and by further narrowly distributing molecular weight. The highest number-average molecular weight among the currently commercially available PPGs (polypropylene glycol) is about 15000. As a commercially available high molecular weight polyether polyol, for example, PREMINOL (registered trademark, the same applies hereafter) manufactured by Asahi Glass Co., Ltd. can be used. PREMINOL 3012 used in Examples is a polymer of a polypropylene glycol obtained by using glycerin as an initiator.

As used herein, the "number-average molecular weight" is calculated by utilizing gel permeation chromatography (GPC) and using calibration curve of a standard polystyrene.

GPC measurement conditions are as follows.
Measuring instrument: ACQUITY UPLC APC system (manufactured by Waters)
Column: APC XT-900, APC XT-200, APC XT-125, APC XT-45 (manufactured by Waters)
Carrier: tetrahydrofuran (THF)
Detector: differential refractometer
Sample: 0.5% by mass THF solution
Calibration curve: polystyrene Diphenylmethane Diisocyanate (a-2)

Examples of the diphenylmethane diisocyanate (a-2) include a 4,4'-diphenylmethane diisocyanate (monomeric MDI)) and a 2,4'-diphenylmethane diisocyanate)(2,4'-MDI).

Isocyanurate Modified Product of Polyisocyanate Compound (b)

The isocyanurate modified product of a polyisocyanate compound (b) is a trimer of various polydiisocyanate compounds such as toluene diisocyanate (TDI), hexamethylene diisocyanate (HDI), xylylene diisocyanate (XDI), naphthalene diisocyanate (NDI), isophorone diisocyanate (IPDI). The trimer may be a trimer of a polyisocyanate compound or may be a mixed trimer of two or more of polyisocyanate compounds, such as HIM and TDI. All 3 functionality in the terminal functional group of the trimer is isocyanate groups (NCO groups).

As the isocyanurate modified product of a polyisocyanate compound (b), commercial products such as TDI isocyanurate trimer (Takenate D204, manufactured by Mitsui Chemicals & SKC Polyurethanes Inc.), HDI isocyanurate trimer (Sumidur N3300, manufactured by Sumika Bayer Urethane Co., Ltd.), IPDI isocyanurate trimer (T1890, manufactured by Evonik Japan Co., Ltd), and combined isocyanurate trimer of HDI and TDI (Desmodur HL, manufactured by Sumika Bayer Urethane Co., Ltd.) can be used. The isocyanurate modified product of a polyisocyanate compound (b) may be used singly or in combination of two or more.

By adding the isocyanurate modified product of a polyisocyanate compound (b), non-primer adhesiveness and moist-heat aging resistance can be enhanced.

The reason for enhancement in non-primer adhesiveness is considered that three isocyanate groups (—NCO) in a molecule of the isocyanurate modified product of a polyisocyanate compound form urethane bonds in the urethane-based composition, and they further form urethane bonds with polar groups introduced by the flame treatment on the surface of a polypropylene base material, this makes interface adhesion strong.

The reason for enhancement in moist-heat aging resistance is considered that isocyanurate rings present in the isocyanurate modified product of a polyisocyanate compound contribute to cohesion expression in the urethane-based composition.

The content of the isocyanurate modified product of a polyisocyanate compound (b) in the urethane-based composition is 0.5 to 3.0 parts by mass and preferably 1.0 to 2.5 parts by mass based on 100 parts by mass of the urethane prepolymer (a). When the content of the isocyanurate modified product of a polyisocyanate compound (b) is less than 0.5 parts by mass, the amount of isocyanurate rings present in the urethane-based composition is decreased and cohesion is lowered, so that moist-heat aging resistance is deteriorated. When the content of the isocyanurate modified product of a polyisocyanate compound (b) is more than 3.0 parts by mass, the amount of NCO groups present in the urethane-based composition, the degree of cure is increased consequently when the urethane-based composition is cured, and interface failure may be caused by the concentration of the stress on the base material interface in the peeling-off, that is, adhesion is deteriorated.

Silane Coupling Agent (c)

The silane coupling agent (c) is an organic silicon compound having two types of functional groups, each having different reactivity, in a molecule. Examples of the silane coupling agent (c) include epoxy silane, vinyl silane, imidazole silane, mercaptosilane, aminosilane, styryl silane, isocyanate silane, sulfide silane, and ureidosilane, and mercaptosilane, aminosilane, sulfide silane, and isocyanate silane are preferably contained in the urethane-based composition to obtain non-primer adhesiveness.

The silane coupling agent (c) forms urethane bonds and siloxane bonds in the urethane-based composition and forms covalent bonds with polar groups introduced by the flame treatment on the surface of a polypropylene base material. Consequently, the silane coupling agent (c) contributes adhesion between the urethane-based composition and the polypropylene base material. These silane coupling agents may be used singly or in combination of two or more.

The content of the silane coupling agent (c) is 0.5 to 5.0 parts by mass, preferably 1.0 to 4.0 parts by mass, and more preferably 1.5 to 2.5 parts by mass based on 100 parts by mass of the urethane prepolymer (a).

When the content of the silane coupling agent (c) is less than 0.5 parts by mass, adhesive force between the urethane-based composition and the polypropylene base material becomes weak and consequently, non-primer adhesiveness particularly under high temperatures becomes weak. When the content of the silane coupling agent (c) more than 5.0 parts by mass, the equivalent ratio of NCO group/OH group of the urethane-based composition may be significantly changed, resulting in lowering of adhesion or quick curability.

Compounds having active hydrogen groups such as mercaptosilane and aminosilane are calculated in terms of the OH equivalent and compounds having functional groups that react with active hydrogen groups such as isocyanate silane are calculated in terms of the NCO equivalent. Silanol groups generated by the hydrolysis of alkoxysilane contained in the silane coupling agent are not included in the calculation of the OH equivalent.

Polyol (d)

Examples of the polyol (d) include a polyethylene glycol (PEG), a polypropylene glycol (PPG), ethylene oxide/propylene oxide copolymer, polytetramethylene ether glycol (PTMEG), a polyether polyol such as sorbitol-based polyol, a polyolefin polyol, a polysiloxane polyol, a rosin polyol, and an acrylic polyol, and in terms of adhesion force with the polypropylene base material, a polyether polyol, an acrylic polyol, a polyolefin polyol or a polysiloxane polyol is preferable. The polyol (d) may be used singly or in combination of two or more.

Specific examples of the olefin polyol include polyisoprene polyol, polybutadiene polyol, hydrogenated polyisoprene polyol, and hydrogenated polybutadiene polyol.

The content of the polyol (d) is 40% to 60% by mass, preferably 40% to 55% by mass, and more preferably 40% to 50% by mass, based on the total amount of the curing agent (B). When the content of the polyol (d) is less than 40% by mass, the equivalent ratio of NCO group/OH group of urethane-based composition becomes high, and good depth curability may not be achieved. When the content of the polyol (d) is more than 60% by mass, unreacted components would remain, and thus good adhesion and quick curability may not be achieved.

The hydroxyl value of the polyol (d) is 50 to 500 mgKOH/g, preferably 50 to 350 mgKOH/g, and more preferably 50 to 200 mgKOH/g.

When the hydroxyl value of the polyol (d) is less than 50 mgKOH/g, the equivalent ratio of NCO group/OH group of the urethane-based composition becomes high, and good depth curability may not be achieved, when the proportion of the main agent becomes large, such as the mixing mass ratio of the main agent to the curing agent being 10:1. When the hydroxyl value of the polyol (d) is more than 500 mgKOH/g, the equivalent ratio of NCO group/OH group of the urethane-based composition becomes low, and when the proportion of the curing agent becomes large, such as the mixing mass ratio of the main agent to the curing agent being 3:1, unreacted components would remain, and thus good adhesion and quick curability may not be achieved.

The curing agent (B) may further include polyols whose hydroxyl value is out of the range of 50 to 500 mgKOH/g.

Amine Catalyst (e)

As the amine catalyst (e), a known catalyst promoting urethane formation reaction or urea formation reaction can be used. The amine catalyst (e) is preferably a tertiary amine, because it can increase urethane formation reactivity and urea formation reactivity.

Specific examples of the amine catalyst (e) include N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylguanidine, 1,3,5-tris(N,N-dimethylaminopropyl)hexahydro-S-triazine, 1,8-diazabicyclo[5.4.0]undecene-7, triethylenediamine, N,N,N',N'-tetramethylhexamethylenediamine, N-methyl-N'-(2-dimethylaminoethyl)piperazine, N,N'-dimethylpiperazine, dimethylcyclohexylamine, N-methylmorpholine, bis(2-dimethylaminoethyl)ether, 1-methylimidazole, 1,2-dimethylimidazole, 1-isobutyl-2-methylimidazole, 1-dimethylaminopropylimidazole, N,N-dimethylethanolamine, N,N-dimethylisopropanolamine, N,N-dimethylhexanolamine, N,N-dimethylaminoethoxyethanol, N,N,N'-trimethyl-N'-(2-hydroxyethyl)ethylenediamine, N,N,N'-trimethyl-N'-(2-hydroxyethyl)propanediamine, N-methyl-N'-(2-hydroxyethyl)piperazine, bis(dimethylaminopropyl)methylamine, bis(dimethylaminopropyl)isopropanolamine, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole, and 3-quinuclidinol.

In particular, imidazole-based amine compound is preferable to achieve both quick curability and open time at the same time.

The amine catalyst (e) may be used singly or in combination of two or more.

The content of the amine catalyst (e) is 1.0% to 10.0% by mass, preferably 1.0% to 8.0% by mass, and more preferably 1.5% to 5.0% by mass, based on the total amount of the curing agent (B).

Carbon Black (f)

The primary average particle diameter of the carbon black (f) is preferably 20 to 40 nm, and more preferably 25 to 35 nm. The average particle diameter of the carbon black within the above specified range allows to adjust the viscosity of the adhesive and the dispersibility of carbon black to more suitable range, so that the workability and strength of the adhesive are more enhanced.

Specific preferred examples of the carbon black (f) include, Asahi #70 (manufactured by Asahi Carbon Co., Ltd.), SEAST 3 (manufactured by Tokai Carbon Co., Ltd., "SEAST" is a registered trademark), Mitsubishi Carbon Black #32 (manufactured by Mitsubishi Chemical Corporation), and Niteron #200 (manufactured by NSCC Carbon Co., Ltd., "Niteron" is a registered trademark). These carbon black may be used singly or in combination of two or more.

A total content of the carbon black (f) is preferably 10% to 30% by mass, and more preferably 10% to 25% by mass, based on the total amount of the main agent (A) and the curing agent (B). The content of the carbon black (g) within the above specified range is preferable because it allows further enhancement of the strength of the adhesive, and additionally to have thixotropic properties in an uncured state, resulting in good workability, and also to have foaming resistance at the time of curing, and furthermore, to have high weather resistance due to high strength and light shielding effect, that is, durable weather resistance after curing.

Kaolin Clay (g)

Examples of the kaolin clay (g) include wet-type kaolin, calcined kaolin, and dry-type kaolin. From the viewpoint of workability, a total content of the kaolin clay (g) is preferably 10% to 35% by mass, and more preferably 15% to 25% by mass, based on the total amount of the main agent (A) and the curing agent (B).

The urethane-based composition of the present embodiment may contain, a filler other than the kaolin clay, such as talc, heavy calcium carbonate, light calcium carbonate, colloidal calcium carbonate, aluminum hydroxide, and magnesium hydroxide.

Plasticizer (h)

The urethane-based composition of the present embodiment may contain the plasticizer (h). Examples of the plasticizer (h) include a phthalate compound, an alkyl sulfonate compound, and an adipate compound. Specific examples of the phthalate compound include dioctyl phthalate (DOP), dibutyl phthalate (DBP), diisononyl phthalate (DINP), diisodecyl phthalate (DIDP), and butyl benzyl phthalate (BBP). The urethane-based composition of the present embodiment may contain not only above-described components, but also additives such as a pigment, a colorant, an anti-aging agent, an antioxidant, an antistatic agent, a flame retardant, an adhesion imparting agent, a dispersing agent, and a solvent.

The equivalent ratio of NCO group/OH group, which is a ratio of the isocyanate group (NCO) to the hydroxyl group (OH) present in the main agent (A) and the curing agent (B), respectively, is 1.0 to 5.0. When the equivalent ratio of NCO group/OH group is less than 1.0, the proportion of the unreacted polyol present when mixing the main agent and curing agent would increase, so that the composition may be uncured or may not have enough adhesion properties. When the equivalent ratio of NCO group/OH group is more than 5.0, the proportion of isocyanate and prepolymer present when mixing the main agent with the curing agent would increase, so that the reaction with water in the air is increased and quick curability and depth curability are compromised.

EXAMPLES

The objects and the advantages of the present disclosure will now be further described in detail by Examples, but the present disclosure is not limited by these Examples.

Examples 1 to 3 and Comparative Examples 1 to 3

Main agents #1 to 6 and curing agents #1 to 6 are prepared by using the method shown below. Main agents #1 to 3 and curing agents #1 to 3 correspond to Examples 1 to 3 and main agents #4 to 6 and curing agents #4 to 6 correspond to Comparative Examples 1 to 3, respectively.

Preparation of Main Agent (Main Agent #1)

A kneading container equipped with a stirrer, nitrogen inlet tube, vacuum pump, and heating-cooling apparatus was charged with 90.9 g of PREMINOL 3012 (polyether polyol, manufactured by Asahi Glass Co., Ltd., number-average molecular weight (Mn): 12000, 3 functionality, hydroxyl value: 14.0 mgKOH/g), 40 g of Mitsubishi Carbon Black #32 (carbon black manufactured by Mitsubishi Chemical Corporation, primary particle size: 28 nm), 21.0 g of ICE-BERG K (calcined clay manufactured by Shiraishi Calcium Kaisha, Ltd.), and 2.7 g of DINP (diisononyl phthalate manufactured by J-PLUS Co., Ltd), and stirred for 30 minutes until each mass of carbon black and calcined clay was dissolved. Then, kneading container was heated until the content reached 100° C., followed by reducing the pressure in the kneading container to 20 mmHg with a vacuum pump, and stirring was continued for 1 hour. Further, the container was cooled until the temperature of the content reached 70° C., to the container were added 9.1 g of Millionate MT (monomeric MDI (diphenylmethane diisocyanate) manufactured by Tosoh Corporation, "Millionate" is a registered trademark, NCO: 33.6% by mass) and 200 ppm of tin catalyst (Nikka OCTHIX stannous octoate), followed by introducing nitrogen and stirring was continued for 1 hour. Further, the kneading container was cooled until the temperature of the content reached 40° C., to the container were added 1.8 g of KBM-803 (a silane coupling agent, mercaptosilane, manufactured by Shin-Etsu Chemical Co., Ltd., active hydrogen equivalent: 196 g/eq), and 1.8 g of Sumidur N3300 (isocyanurate-modified HDI manufactured by Sumika Bayer Urethane Co., Ltd., NCO: 25.0% by mass), and the mixture was stirred for 10 minutes. The reaction product between PREMINOL 3012 and Millionate MT obtained in the above process was used as the urethane prepolymer.

(Main Agents #2 to 6)

Main agents #2 to 6 were prepared in a similar manner as the main agent #1.

Preparation of Curing Agent (Curing Agent #1)

A kneading container equipped with a stirrer, nitrogen inlet tube, vacuum pump, and heating-cooling apparatus was charged with 88.0 g of R-15HT (polybutadiene polyol manufactured by Idemitsu Kosan Co., Ltd., 2.3 functionality, hydroxyl value: 103 mgKOH/g), 12.0 g of PREMINOL 7012 (polyether polyol manufactured by Asahi Glass Co., Ltd., 3 functionality, hydroxyl value: 16.8 mgKOH/g), 2.0 g of EDP-300 (modified ethylene diamine propylene oxide manufactured by ADEKA Corporation, 4 functionality, hydroxyl value: 760 mgKOH/g), 41.0 g of Asahi #70 (carbon black manufactured by Asahi Carbon Co., Ltd., primary particle size: 28 nm), and 67.0 g of ICEBERG K (calcined clay manufactured by Shiraishi Calcium Kaisha, Ltd.), and stirred for 30 minutes until each mass of carbon black and calcined clay was dissolved. Then, the kneading container was heated until the content reached 100° C., followed by reducing the pressure in the kneading container to 20 mmHg with a vacuum pump, and stirring was continued for 1 hour. Further, the kneading container was cooled until the temperature of the content reached 40° C., to the container was added 6.0 g of U-CAT660M (amine catalyst manufactured by San-Apro Ltd.), and the mixture was stirred for 10 minutes.

(Curing Agent #2)

A kneading container equipped with a stirrer, nitrogen inlet tube, vacuum pump, and heating-cooling apparatus was charged with 100.0 g of UT-1001 (polyfunctional hydroxy acrylic polymer manufactured by Soken Chemical & Engineering Co., Ltd., hydroxyl value: 58 mgKOH/g), 2.0 g of EDP-300 (modified ethylene diamine propylene oxide manufactured by ADEKA Corporation, 4 functionality, hydroxyl value: 760 mgKOH/g), 41.0 g of Asahi #70 (carbon black manufactured by Asahi Carbon Co., Ltd., primary particle size: 28 nm), and 67.0 g of ICEBERG K (calcined clay manufactured by Shiraishi Calcium Kaisha, Ltd.), and stirred for 30 minutes until each mass of carbon black and calcined clay was dissolved. Then, the kneading container was heated until the content reached 100° C., followed by reducing the pressure in the kneading container to 20 mmHg with a vacuum pump, and stirring was continued for 1 hour. Further, the kneading container was cooled until the temperature of the content reached 40° C., to the container was added 6.0 g of U-CAT660M (amine catalyst manufactured by San-Apro Ltd.), and the mixture was stirred for 10 minutes.

(Curing Agent #3)

A kneading container equipped with a stirrer, nitrogen inlet tube, vacuum pump, and heating-cooling apparatus was charged with 10.0 g of EXCENOL 720 (polyether polyol manufactured by Asahi Glass Co., Ltd., 2 functionality, hydroxyl value: 160 mgKOH/g), 90.0 g of EXCENOL 2020 (polyether polyol manufactured by Asahi Glass Co., Ltd., 2 functionality, hydroxyl value: 56 mgKOH/g), 2.0 g of EDP-300 (modified ethylene diamine propylene oxide manufactured by ADEKA Corporation, 4 functionality, hydroxyl value: 760 mgKOH/g), 41.0 g of Asahi #70 (carbon black manufactured by Asahi Carbon Co., Ltd., primary particle size: 28 nm), and 67.0 g of ICEBERG K (calcined clay manufactured by Shiraishi Calcium Kaisha, Ltd.), and stirred for 30 minutes until each mass of carbon black and calcined clay was dissolved. Then, the kneading container was heated until the content reached 100° C., followed by reducing the pressure in the kneading container to 20 mmHg with a vacuum pump, and stirring was continued for 1 hour. Further, the kneading container was cooled until the temperature of the content reached 40° C., to the container was added 6.0 g of U-CAT660M (amine catalyst manufactured by San-Apro Ltd.), and the mixture was stirred for 10 minutes.

(Curing Agent #4)

A kneading container equipped with a stirrer, nitrogen inlet tube, vacuum pump, and heating-cooling apparatus was charged with 77.0 g of EXCENOL 720 (polyether polyol manufactured by Asahi Glass Co., Ltd., 2 functionality, hydroxyl value: 160 mgKOH/g), 23.0 g of EXCENOL 1030 (polyether polyol manufactured by Asahi Glass Co., Ltd., 3 functionality, hydroxyl value: 168 mgKOH/g), 2.0 g of EDP-300 (modified ethylene diamine propylene oxide manufactured by ADEKA Corporation, 4 functionality, hydroxyl value: 760 mgKOH/g), 41.0 g of Asahi #70 (carbon black manufactured by Asahi Carbon Co., Ltd., primary particle size: 28 nm), 67.0 g of ICEBERG K (calcined clay manufactured by Shiraishi Calcium Kaisha, Ltd.), and stirred for 30 minutes until each mass of carbon black and calcined clay was dissolved. Then, the kneading container was heated until the content reached 100° C., followed by reducing the pressure in the kneading container to 20 mmHg with a vacuum pump, and stirring was continued for 1 hour. Further, the kneading container was cooled until the temperature of the content reached 40° C., to the container was added 6.0 g of U-CAT660M (amine catalyst manufactured by San-Apro Ltd.), and the mixture was stirred for 10 minutes.

(Curing Agent #5)

A kneading container equipped with a stirrer, nitrogen inlet tube, vacuum pump, and heating-cooling apparatus was charged with 100.0 g of PREMINOL 7012 (polyether polyol manufactured by Asahi Glass Co., Ltd., 3 functionality, hydroxyl value: 16.8 mgKOH/g), 2.0 g of EDP-300 (modified ethylene diamine propylene oxide manufactured by ADEKA Corporation, 4 functionality, hydroxyl value: 760 mgKOH/g), 41.0 g of Asahi #70 (carbon black manufactured by Asahi Carbon Co., Ltd., primary particle size: 28 nm), and 67.0 g of ICEBERG K (calcined clay manufactured by Shiraishi Calcium Kaisha, Ltd.), and stirred for 30 minutes until each mass of carbon black and calcined clay was dissolved. Then, the kneading container was heated until the content reached 100° C., followed by reducing the pressure in the kneading container to 20 mmHg with a vacuum pump, and stirring was continued for 1 hour. Further, the kneading container was cooled until the temperature of the content reached 40° C., to the container was added 6.0 g of U-CAT660M (amine catalyst manufactured by San-Apro Ltd.), and the mixture was stirred for 10 minutes.

(Curing Agent #6)

A kneading container equipped with a stirrer, nitrogen inlet tube, vacuum pump, and heating-cooling apparatus was charged with 51.0 g of EDP-1100 (modified ethylene diamine propylene oxide manufactured by ADEKA Corporation, 4 functionality, hydroxyl value: 214 mgKOH/g), 51.0 g of EDP-300 (modified ethylene diamine propylene oxide manufactured by ADEKA Corporation, number-average molecular weight: 300, 4 functionality, hydroxyl value: 760 mgKOHlg), 41.0 g of Asahi #70 (carbon black manufactured by Asahi Carbon Co., Ltd., primary particle size: 28 nm), and 67.0 g of ICEBERG K (calcined clay manufactured by Shiraishi Calcium Kaisha, Ltd.), and stirred for 30 minutes until each mass of carbon black and calcined clay was dissolved. Then, the kneading container was heated until the content reached 100° C., followed by reducing the pressure in the kneading container to 20 mmHg with a vacuum pump, and stirring was continued for 1 hour. Further, the kneading container was cooled until the temperature of the content reached 40° C., to the container was added 6.0 g of U-CAT660M (amine catalyst manufactured by San-Apro Ltd.), and the mixture was stirred for 10 minutes.

The blending composition of the main agents #1 to 6 and the curing agents #1 to 6 (unit: parts by mass) are shown in Table 1, collectively.

Evaluation of Urethane-Based Composition

Above-described main agents and curing agents are used to evaluate depth curability, quick curability and non-primer adhesiveness by the method shown below. The mixing mass ratio of the main agent to the curing agent is selected from 3 patterns, that is, 10:1, 6:1, and 3:1.

[Depth Curability]

Main agents and curing agents corresponding to Examples 1 to 3 and Comparative Examples 1 to 3 were mixed at the above specified blending ratio with a planetary device. The mixture obtained was allowed to flow into a conical container made of polypropylene having a diameter of 3 cm×height of 3 cm, allowed to stand for curing at 23° C., under 50% RH (relative humidity) for 72 hours, to obtain a sample after curing. The sample obtained was cut in half with a knife so as to be a semicircular shape and was evaluated for the tackiness of the cross section.

The evaluation of depth curability was determined as "A" when no tackiness of the cross section was remained, determined as "B" when the tackiness of the cross section was slightly remained, and determined as "C" when the cross section remained uncured or had a lot of tackiness.

[Quick Curability]

Main agents and curing agents corresponding to Examples 1 to 3 and Comparative Examples 1 to 3 were mixed at the above specified blending ratio with a planetary device. The mixture obtained was directly applied to the polypropylene base material subjected to flame treatment in a bead-shape, and an exfoliate paper was stacked thereon and contact-bonded so that the height of the adhesive becomes 3 mm, this was then put into a dryer at 60° C. for 10 minutes to cure to obtain a measurement sample for quick curability. This sample was subjected to peel test by cutting with a knife and was evaluated for quick curability.

The evaluation of adhesion of the adhesive was determined as "A" when the cohesive failure occurred at the adhered portion and determined as "B" when interface failure occurred between the surface of the polypropylene base material and the adhesive.

[Non-Primer Adhesiveness]

Two pieces of polypropylene base materials subjected to flame treatment were provided. Main agents and curing agents corresponding to Examples 1 to 3 and Comparative Examples 1 to 3 were mixed at the above specified blending ratio with a planetary device, and the mixture obtained was applied to one of base materials with a thickness of 3 mm. This base material was laminated together with a surface of the other base material so that the adhesive area becomes 250 mm$^2$ (25 mm×10 mm) and contact-bonded to prepare a test specimen.

The test specimen prepared was allowed to stand for curing at 23° C. under 50% RH (relative humidity) for 72 hours, to obtain a test specimen after curing. This test specimen was subjected to the tensile test under 23° C. in accordance with HS K6850:1999, shear strength was measured, and breaking strength was recorded. When the adhesive remained uncured, the adhesive was evaluated as "uncured" and no measurement was performed. The breaking state was visually observed, and the adhesive was determined as "CF" when the cohesive failure occurred and determined as "AF" when the interface was peeled between the base material and the adhesive.

TABLE 1

| | Material | | Blending composition (parts by mass) | | | | | |
|---|---|---|---|---|---|---|---|---|
| | | | #1 | #2 | #3 | #4 | #5 | #6 |
| Main agent | Urethane prepolymer | PREMINOL 3012 | 90.9 | 90.9 | 90.9 | 90.9 | 90.9 | 90.9 |
| | | Millionate MT | 9.1 | 9.1 | 9.1 | 9.1 | 9.1 | 9.1 |
| | Carbon black | Mitsubishi Carbon Black #32 | 40 | 40 | 40 | 40 | 40 | 40 |
| | Kaolin clay | ICEBERG K | 21 | 21 | 21 | 21 | 21 | 21 |
| | Plasticizer | DINP | 2.7 | 2.7 | 2.7 | 2.7 | 2.7 | 2.7 |
| | Mercaptosilane | KBM-803 | 1.8 | 1.8 | 1.8 | 1.8 | 1.8 | 1.8 |
| | HDI isocyanurate | Sumidur N3300 | 1.8 | 1.8 | 1.8 | 1.8 | 1.8 | 1.8 |
| Curing agent | Polyol | R-15HT | 88 | — | — | — | — | — |
| | | PREMINOL 7012 | 12 | — | — | — | 100 | — |
| | | UT-1001 | — | 100 | — | — | — | — |
| | | EXCENOL 720 | — | — | 10 | 77 | — | — |
| | | EXCENOL 2020 | — | — | 90 | — | — | — |
| | | EXCENOL 1030 | — | — | — | 23 | — | — |
| | | EDP-1100 | — | — | — | — | — | 51 |
| | | EDP-300 | 2 | 2 | 2 | 2 | 2 | 51 |
| | Carbon black | Asahi #70 | 41 | 41 | 41 | 41 | 41 | 41 |
| | Kaolin clay | ICEBERG K | 67 | 67 | 67 | 67 | 67 | 67 |
| | Amine catalyst | U-CAT660M | 6 | 6 | 6 | 6 | 6 | 6 |

TABLE 2

| | | | Example | | | Comparative Examples | | |
|---|---|---|---|---|---|---|---|---|
| | | | 1 | 2 | 3 | 1 | 2 | 3 |
| Results | Mixing mass ratio | Main agent/Curing agent | #1 | #2 | #3 | #4 | #5 | #6 |
| | Main agent:Curing agent = 10:1 | Equivalent ratio of NCO group/OH group | 3.4 | 5.0 | 3.7 | 2.0 | 12.4 | 0.7 |
| | | Depth curability | A | A | A | A | C | B |
| | | Quick curability | A | A | A | A | B | B |
| | | Non-primer adhesiveness  Shear strength (MPa) | 3.5 | 3.9 | 3.6 | 3.1 | uncured | 0.9 |
| | | Breaking state | CF | CF | CF | CF | | CF |
| | Main agent:Curing agent = 6:1 | Equivalent ratio of NCO group/OH group | 2.0 | 3.0 | 2.2 | 1.2 | 7.4 | 0.4 |
| | | Depth curability | A | A | A | A | B | C |
| | | Quick curability | A | A | A | A | B | B |
| | | Non-primer adhesiveness  Shear strength (MPa) | 2.9 | 3.5 | 3.2 | 2.5 | 0.9 | uncured |
| | | Breaking state | CF | CF | CF | CF | CF | |
| | Main agent:Curing agent = 3:1 | Equivalent ratio of NCO group/OH group | 1.0 | 1.5 | 1.1 | 0.6 | 3.7 | 0.2 |
| | | Depth curability | A | A | A | B | A | C |
| | | Quick curability | A | A | A | B | A | B |
| | | Non-primer adhesiveness  Shear strength (MPa) | 2.4 | 2.7 | 2.5 | 0.7 | 4.0 | uncured |
| | | Breaking state | CF | CF | CF | CF | CF | |

As is apparent from Table 2, urethane-based compositions of Examples 1 to 3 have excellent quick curability, depth curability, and non-primer adhesiveness, in all the range of 10:1 to 3:1 of the mixing mass ratio of the main agent to the curing agent. In addition, the more the amount of the main agent increases, the more excellent the adhesion strength tends to be. On the other hand, it was revealed that urethane-based compositions of Comparative Examples 1 to 3 have blending ratios that lower at least one of physical properties such as quick curability, depth curability, and non-primer adhesiveness within a range of 10:1 to 3:1 of the mixing mass ratio of the main agent to the curing agent.

The invention claimed is:

1. A two-part curable urethane-based composition comprising:
a main agent (A); and
a curing agent (B), wherein
the main agent (A) contains a urethane prepolymer (a), an isocyanurate modified product of a polyisocyanate compound (b), and a silane coupling agent (c); a content of the isocyanurate modified product of a polyisocyanate compound (b) is 0.5 to 3.0 parts by mass based on 100 parts by mass of the urethane prepolymer (a); a content of the silane coupling agent (c) is 0.5 to 5.0 parts by mass based on 100 parts by mass of the urethane prepolymer (a),
the curing agent (B) contains a polyol (d) having a hydroxyl value of 50 to 500 mgKOH/g and an amine catalyst (e); a content of the polyol (d) is 40% to 60% by mass based on a total amount of the curing agent (B); a content of the amine catalyst (e) is 1.0% to 10.0% by mass based on the total amount of the curing agent (B),
a mixing mass ratio of the main agent (A) to the curing agent (B) is 3:1 to 10:1, and
an equivalent ratio of NCO group/OH group in the main agent (A) and the curing agent (B), respectively, is 1.0 to 5.0.

2. The two-part curable urethane-based composition according to claim 1, wherein at least one of the main agent (A) and the curing agent (B) further contains a carbon black (f), and a total content of the carbon black (f) is 10% to 30% by mass based on a total amount of the main agent (A) and the curing agent (B).

3. The two-part curable urethane-based composition according to claim 1, wherein at least one of the main agent (A) and the curing agent (B) further contains a kaolin clay (g), and a total content of the kaolin clay (g) is 10% to 35% by mass based on the total amount of the main agent (A) and the curing agent (B).

4. The two-part curable urethane-based composition according to claim 1, wherein the urethane prepolymer (a) is a reaction product of a polyether polyol (a-1) having a number-average molecular weight of 8000 or more and diphenylmethane diisocyanate (a-2).

5. The two-part curable urethane-based composition according to claim 2, wherein at least one of the main agent (A) and the curing agent (B) further contains a kaolin clay (g), and a total content of the kaolin clay (g) is 10% to 35% by mass based on the total amount of the main agent (A) and the curing agent (B).

6. The two-part curable urethane-based composition according to claim 2, wherein the urethane prepolymer (a) is a reaction product of a polyether polyol (a-1) having a number-average molecular weight of 8000 or more and diphenylmethane diisocyanate (a-2).

7. The two-part curable urethane-based composition according to claim 3, wherein the urethane prepolymer (a) is a reaction product of a polyether polyol (a-1) having a number-average molecular weight of 8000 or more and diphenylmethane diisocyanate (a-2).

8. The two-part curable urethane-based composition according to claim 5, wherein the urethane prepolymer (a) is a reaction product of a polyether polyol (a-1) having a number-average molecular weight of 8000 or more and diphenylmethane diisocyanate (a-2).

* * * * *